US008920040B2

(12) United States Patent
Brameshuber et al.

(10) Patent No.: US 8,920,040 B2
(45) Date of Patent: Dec. 30, 2014

(54) ROLLING ELEMENT BEARING

(75) Inventors: Josef Brameshuber, Neuzeug (AT); Hubert Friedrich Koettritsch, Amstetten (AT); Gerhard Strohmayr, Steyr (AT)

(73) Assignee: Aktienbolaget SKF, Goteborg (SE)

( * ) Notice: Subject to any disclaimer, the term of this patent is extended or adjusted under 35 U.S.C. 154(b) by 0 days.

(21) Appl. No.: 13/983,388

(22) PCT Filed: Feb. 2, 2012

(86) PCT No.: PCT/EP2012/051736
§ 371 (c)(1),
(2), (4) Date: Oct. 30, 2013

(87) PCT Pub. No.: WO2012/104367
PCT Pub. Date: Aug. 9, 2012

(65) Prior Publication Data
US 2014/0050431 A1 Feb. 20, 2014

(30) Foreign Application Priority Data
Feb. 2, 2011 (DE) .......................... 10 2011 003 513

(51) Int. Cl.
*F16C 19/38* (2006.01)
*F16C 33/66* (2006.01)
(Continued)

(52) U.S. Cl.
CPC ........... *F16C 33/583* (2013.01); *F16C 33/4605* (2013.01); *F16C 33/6681* (2013.01); *F16C 33/6629* (2013.01); *D21F 7/02* (2013.01); *D21G 1/0226* (2013.01); *F16C 19/52* (2013.01); *F16C 23/086* (2013.01); *F16C 33/585* (2013.01); *F16C 19/06* (2013.01); *F16C 19/08* (2013.01); *F16C 41/008* (2013.01)
USPC ........... 384/558; 384/475; 384/495; 384/512; 384/621; 384/504

(58) Field of Classification Search
CPC ............. F16C 33/4605; F16C 33/6629; F16C 33/6681
USPC ......... 384/475, 564–565, 619, 622, 558–559, 384/495, 512, 504, 621
See application file for complete search history.

(56) References Cited

U.S. PATENT DOCUMENTS 2,387,962 A 10/1945 Williams
2,518,942 A 8/1950 Schmidt
(Continued)

FOREIGN PATENT DOCUMENTS

DE 572846 A 3/1933
DE 965671 C 6/1957
(Continued)

*Primary Examiner* — Marcus Charles
(74) *Attorney, Agent, or Firm* — Bryan Peckjian; SFK USA Inc. Patent Department

(57) ABSTRACT

A rolling-element bearing includes an inner ring and an outer ring having at least two adjacently disposed raceways for at least two rows of rolling elements. In order to avoid or reduce corrosion on the raceways of the outer ring caused by condensation forming on the outer raceway, the outer ring has at least one radially-outwardly-extending groove in the axial region between its at least two raceways for collecting condensation at a location away from the raceways.

9 Claims, 3 Drawing Sheets

(51) Int. Cl.
*F16C 23/08* (2006.01)
*F16C 33/58* (2006.01)
*F16C 33/46* (2006.01)
*D21F 7/02* (2006.01)
*D21G 1/02* (2006.01)
*F16C 19/52* (2006.01)
*F16C 19/06* (2006.01)
*F16C 19/08* (2006.01)
*F16C 41/00* (2006.01)

(56) References Cited

U.S. PATENT DOCUMENTS

| | | | | |
|---|---|---|---|---|
| 2,767,037 | A * | 10/1956 | Williams | 384/482 |
| 2,877,068 | A * | 3/1959 | Schaefer | 384/537 |
| 3,912,346 | A | 10/1975 | Boratynski et al. | |
| 3,957,319 | A * | 5/1976 | Gorski | 384/556 |
| 3,981,550 | A * | 9/1976 | Zimmer et al. | 384/558 |
| 4,916,750 | A * | 4/1990 | Scott | 384/484 |
| 5,009,524 | A * | 4/1991 | Dittenhoefer | 384/475 |
| 6,152,606 | A * | 11/2000 | Shirosaki et al. | 384/558 |
| 6,814,494 | B2 * | 11/2004 | Borowski et al. | 384/484 |
| 7,918,649 | B2 * | 4/2011 | Nakagawa et al. | 416/174 |
| 2003/0198416 | A1 * | 10/2003 | Borowski et al. | 384/477 |
| 2007/0297706 | A1 * | 12/2007 | Mori | 384/558 |
| 2008/0260313 | A1 * | 10/2008 | Murai et al. | 384/473 |

FOREIGN PATENT DOCUMENTS

| | | | | |
|---|---|---|---|---|
| DE | 19817192 | A1 | 10/1998 | |
| EP | 0649990 | A1 * | 4/1995 | F16C 19/28 |
| EP | 2130640 | A1 | 12/2009 | |
| FR | 2754864 | A1 * | 4/1998 | F16C 23/08 |
| GB | 747314 | A | 4/1956 | |
| JP | 07167137 | A * | 7/1995 | F16C 23/08 |
| JP | 11336753 | A | 12/1999 | |
| JP | 2006177446 | A | 7/2006 | |
| JP | 2007132416 | A * | 5/2007 | |
| JP | 2008020035 | A * | 1/2008 | |
| JP | 2008082364 | A * | 4/2008 | |
| JP | 2008202728 | A * | 9/2008 | F16H 55/36 |
| JP | 2011021623 | A * | 2/2011 | |
| WO | 0221007 | A1 | 3/2002 | |
| WO | WO 2009046706 | A2 * | 4/2009 | G01P 3/44 |

* cited by examiner

ROLLING ELEMENT BEARING

CROSS-REFERENCE

This application is the U.S National Stage of International Application No. PCT/EP2012/051736 filed on Feb. 2, 2012, which claims priority to German patent application no. 10 2011 003 513.3 filed on Feb. 2, 2011.

Technical Field

The invention relates to a rolling-element bearing, comprising an inner ring and an outer ring, wherein the inner ring and the outer ring have at least two raceways disposed adjacent to one another for at least two rows of rolling elements.

BACKGROUND

Rolling-element bearings of this type come into use for example in paper-making machines and in this case are often embodied as spherical roller bearings. These bearings have the advantage that (small) pivoting angles between the axes of the inner ring and of the outer ring can be compensated. The outer ring raceway in this case extends arcuately, wherein respective sections of the arc function as raceways.

In the mentioned usage—but of course also in other usages—the bearing must often be used in a damp environment, such that condensation can form, which enters into the bearing.

Such a situation is shown in FIGS. 1 and 2. The spherical roller bearing 1 includes an inner ring 2 and an outer ring 3, wherein the bearing rings are each formed one-piece. The inner ring 2 has two raceways 4 and 5 for rolling elements 8 or 9; the outer ring has corresponding raceways 6 and 7 for the rolling elements 8, 9. The rolling elements 8, 9 are held by a cage 16.

The outer ring raceways 6, 7 form sections of a spherical track, which is formed arcuately in radial section. Accordingly, the spherical contour continues uninterrupted axially between the raceways 6, 7, as can be seen in FIG. 1 and in FIG. 2.

If moisture enters into the bearing or a medium condenses in the region of the bearing, the moisture collects at the deepest point of the outer ring 3—due to the fact that the raceway surface of the outer ring continuously rises laterally up to the axial end of the outer ring 3. Until the moisture can flow away over the end sides of the outer ring 3, at least in the rest state of the bearing the moisture remains in the bearing interior, which is illustrated by the accumulated moisture 17. Here a fluid level h is already reached with relatively little moisture, which fluid level h extends into the region of the raceways 6, 7 for the rolling elements 8, 9. Accordingly the risk exists that even with relatively little moisture the raceways can corrode.

After the idle-state of the bearing, the penetrated moisture must accordingly first be pressed back out of the bearing interior by the rolling elements, so that it can run out over the lateral side surfaces of the bearing outer ring. Up to this point, however, damage to the raceways of the outer ring has sometimes already occurred.

The condensation of moisture in the bearing accordingly leads to an idle-state-corrosion of the raceways, which negatively affects the raceways, i.e. the functional surfaces of the bearing, even with relatively small amounts of liquid. This effect can also be caused, for example, if volumes of moisture reach into the bearing interior due to washing processes.

In this way, bearing failures due to corrosion are caused relatively quickly in a disadvantageous manner. The bearing service life is accordingly reduced. The bearings also quickly become incapable of being repaired, i.e. with sufficient corrosion a repair is no longer possible; instead the bearing must be scrapped.

SUMMARY OF THE INVENTION

The object underlying the invention is therefore to form a rolling-element bearing of the above-described type such that the disadvantageous effect of moisture which has entered into the bearing is reduced. Accordingly, even in the case that moisture enters into the bearing, its corrosive properties on the raceways of the bearing outer ring are reduced.

The solution of this object by the invention is characterized in that the outer ring of the rolling element bearing has a radially-outwardly-extending groove in the axial region between its at least two raceways for the rolling elements.

This groove functions as a condensation-collecting groove and has a certain holding capacity for condensation or liquid, in order to hold it or them away from the raceways.

The outer ring here has the at least two raceways for the rolling elements preferably formed as a one-piece part.

The rolling-element bearing is particularly preferably formed as a double row spherical roller bearing or self-aligning ball bearing.

The groove can have a substantially rectangular shape in radial section. The axial end regions of the groove are preferably formed rounded in radial section. Alternatively, it can also be provided that the groove has a substantially trapezoidal shape in radial section.

At least one bore can be machined into the outer ring, which bore connects the base of the groove to the outer circumference of the outer ring. Liquid can be discharged from the groove via the bore.

For this purpose a plurality of bores can also be disposed distributed around the outer circumference of the outer ring. Liquid can then be discharged at various positions of the bearing outer ring.

A particularly preferred design of the invention provides, however, that only a single bore is machined into the outer ring, wherein the outer ring has a marking which marks the position of the bore on the circumference of the outer ring. The outer ring can thus be intentionally mounted such that the bore comes to lie at the geodetically-lowest point of the groove, and accordingly reliably discharges all liquid from the groove.

The rolling-element bearing is preferably a component of a paper-making system.

With the proposed conception of a rolling-element bearing, a substantial prevention of corrosion on the outer ring raceway and the rolling elements is possible, in particular in the case of double row barrel roller bearings (spherical roller bearings) and self-aligning ball bearings, wherein condensation formation can occur (e.g. in paper machines), and also there where bearings can be damaged by washing liquids.

The bearing service life can be substantially extended by the proposed design. Furthermore, early failures can be prevented.

Corrosion can make the bearing irreparable; the proposed condensation- or liquid-collecting groove thus makes it possible to maintain the bearing in a better condition, so that in the given case repairs are still possible and scrapping can be prevented. Only the condensation-collecting groove will corrode, however not the adjacent raceways for the rolling elements.

BRIEF DESCRIPTION OF DRAWINGS

Exemplary embodiments of the invention are shown in the drawings.

DETAILED DESCRIPTION

Figure 3:
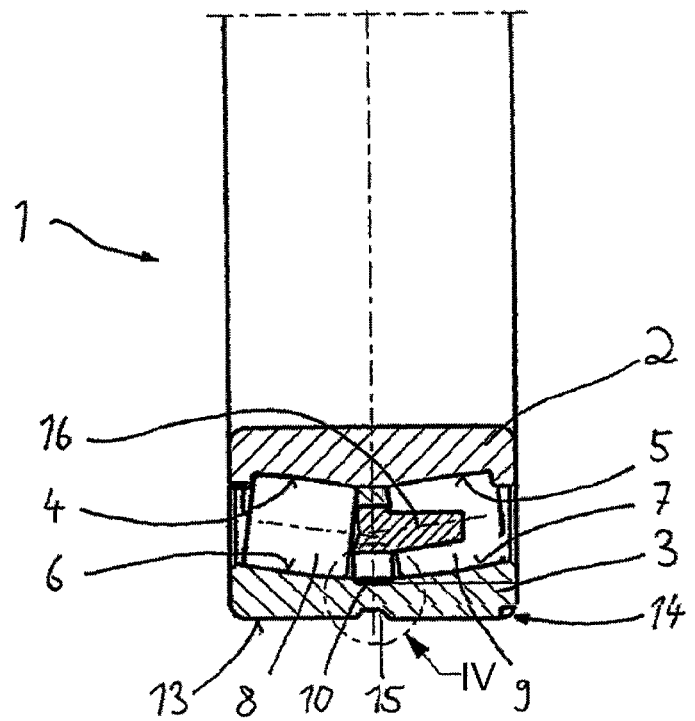
FIG. 3 shows the radial section through an inventively-designed spherical roller bearing.

An inventively-designed spherical roller bearing 1 is shown in FIG. 3. The inner ring 2 and the outer ring 3 have—as was explained in connection with FIG. 1—respective raceways 4 and 5 or 6 and 7 for the rolling element rows 8 and 9.

The outer ring raceways 6 and 7 now however are not produced as sections of a continuous spherical shape of the radially-inner-lying surface of the outer ring 3. Rather, a groove 10 in the form of a circulating annular groove is machined between the two raceways 6 and 7.

Figure 4:
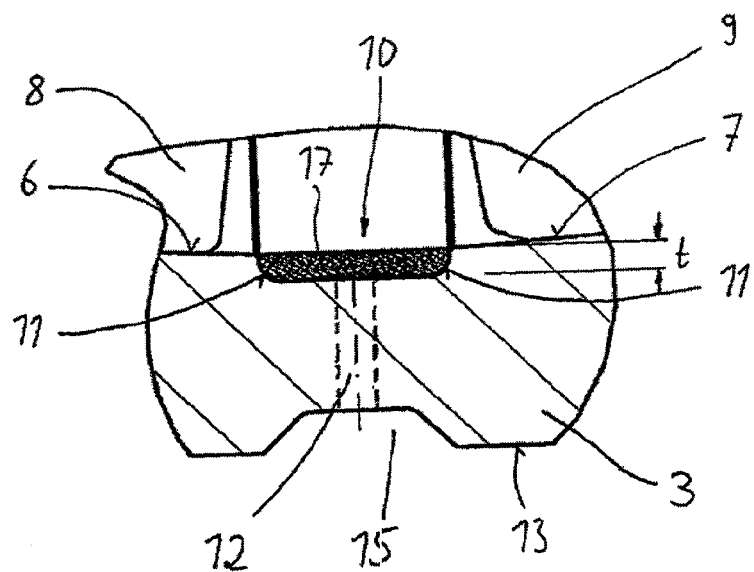
FIG. 4 shows an enlarged portion of FIG. 3 that is identified by the circled area in FIG. 3, which is labeled with reference numeral "IV".

As can be seen in the detailed view in FIG. 4, the groove 10 has a substantially rectangular shape in radial section. The axial end regions of the groove 10 are only provided with roundings 11.

The groove depth t is chosen such that—without appreciably weakening the outer ring 3—a sufficient holding space for liquid is formed in the region of the deepest point of the outer ring 3. The maximum possible fluid level of the liquid can thus reach the groove depth t before liquid leaves the groove and reaches the region of the raceways 6, 7.

Figure 1:
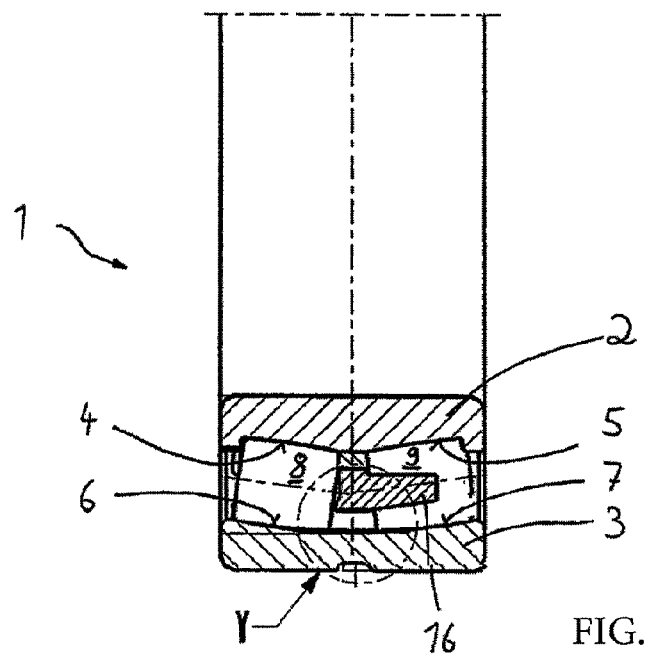
FIG. 1 shows the radial section through a spherical roller bearing according to the prior art.
Figure 2:
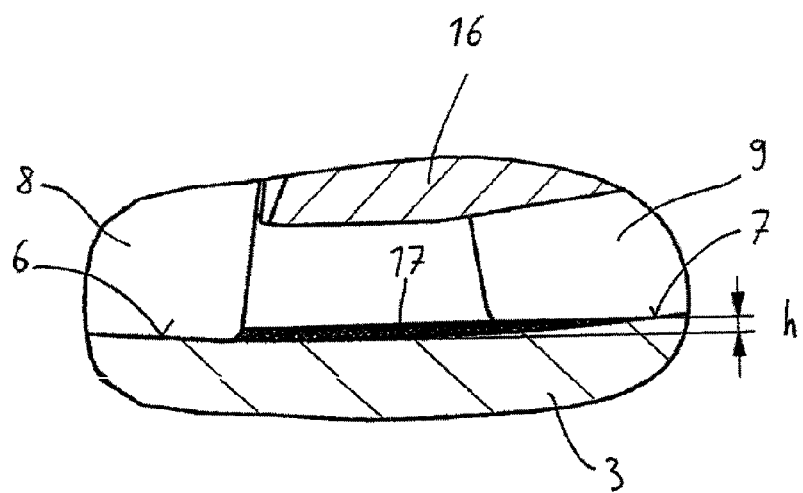
FIG. 2 shows the detail "Y" according to FIG. 1.

Accordingly, in comparison with previously known solutions according to FIG. 1, it can be achieved that the raceways 6, 7 are protected from condensation.

Further, in the exemplary embodiment according to FIG. 3 and FIG. 4, a bore 12 is present at a circumferential point of the outer ring 3 (however not shown in FIG. 3), which begins in the groove base of the groove 10 and extends radially outward up to the outer circumference 13 of the outer ring 3. In the exemplary embodiment, the bore 12 discharges in the radially-outer region in a recess 15, which is machined into the outer ring 3.

In FIG. 3 it is indicated that the outer ring 3 can be provided with a marking 14 which marks the position at which the bore 12 is disposed. In this way, it can be ensured during the assembly of the bearing 1, and in particular of the outer ring 3, that the outer ring 3 is mounted such that the bore comes to lie at the geodetically lowest point of the groove 10 and thus deliberately discharges moisture from the groove 10 and thus from the bearing interior.

Thus, while in solutions according to the prior art a fluid level of the moisture is reached in the bearing outer ring which puts parts of the raceways under water, with an appropriate design of the groove between the raceways, liquid can be collected such that the raceways are kept dry.

The axial width of the groove 10 is thus chosen such that the spherical roller bearing maintains the desired or required relative pivotability between the inner ring and the outer ring, i.e. the raceways are in this respect fully functional. The rolling of the rolling elements on the outer ring raceways is therefore not impeded by the groove 10, even under maximum pivoting of the mentioned axes.

The depth of the groove 10 is chosen such that a desired holding space for moisture is available, without the stability of the outer ring being negatively influenced.

Figure 5:
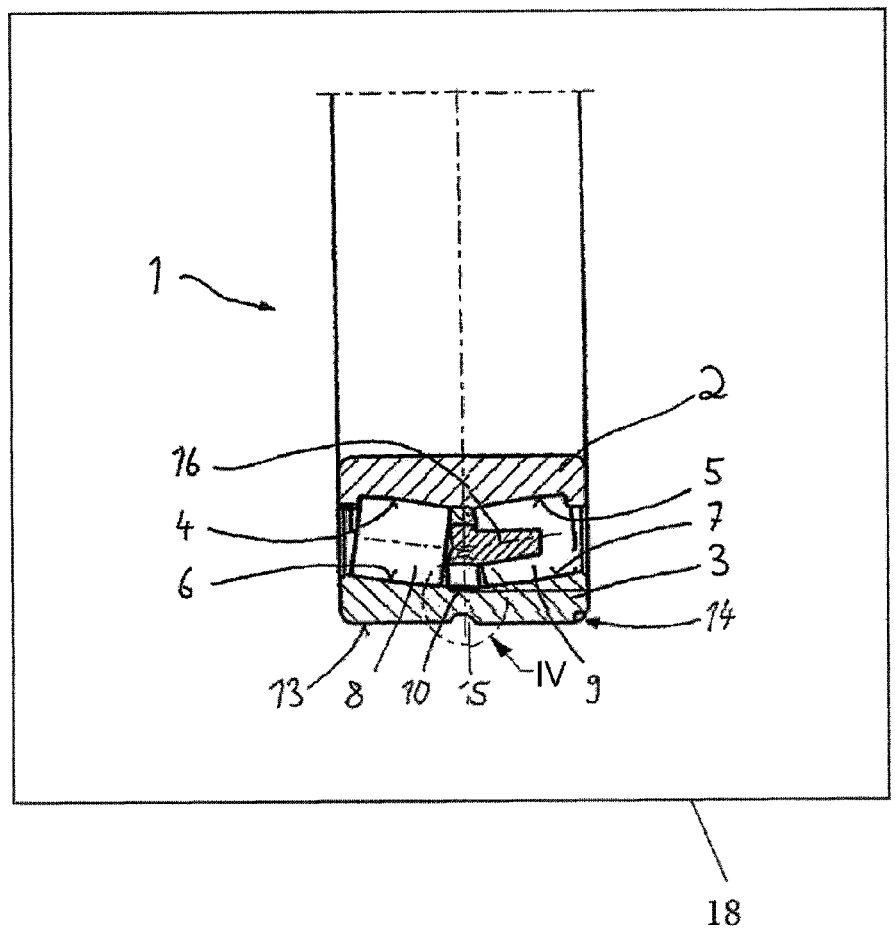
FIG. 5 schematically shows the inventively-designed spherical roller bearing of FIG. 3 as a component of a paper-making system.

Such applications are the preferred application for the proposed bearing, applications in which steam is present in the region of the bearing, which steam can condense in the interior of the bearing. Here for example a paper machine 18 is mentioned, and illustrated schematically in FIG. 5, wherein wet and hot materials must be processed.

REFERENCE NUMBER LIST

1 Rolling element bearing (spherical roller bearing)
2 Inner ring
3 Outer ring
4 Raceway
5 Raceway
6 Raceway
7 Raceway
8 Rolling elements
9 Rolling elements
10 Groove
11 Rounding
12 Bore
13 Outer circumference
14 Marking
15 Recess
16 Cage
17 Moisture
18 Paper machine
h Fluid level
t Groove depth

The invention claimed is:

1. A rolling-element bearing, comprising an inner ring and an outer ring, wherein the inner ring and the outer ring have at least two raceways disposed adjacent to one another for at least two rows of rolling elements,
    wherein the outer ring has the at least two raceways for the rolling elements, which raceways are a one-piece-formed part,
    wherein the at least two rows of rolling elements are axially aligned by a cage,
    wherein the outer ring has at least one radially-outwardly-extending groove in the axial region between its at least two raceways for the rolling elements, the radially-outwardly-extending groove configured to collect fluid from within the bearing,
    wherein the cage and the radially-outwardly-extending groove are in facing opposition and define opposite sides of a chamber in which only fluid may be located such that fluid can condensate for collection in the radially-outwardly-extending groove,
    wherein the rolling element bearing is formed as a double row spherical roller bearing or self-aligning ball bearing, so that the raceways of the outer ring lie on an arc that is concave in radial section,
    wherein the groove has a substantially rectangular shape or trapezoidal shape in radial section, wherein a single bore is machined into the outer ring, which bore connects the base of the groove to the outer circumference of the outer ring, and wherein the outer ring has a marking which marks the position of the bore on the circumference of the outer ring.

2. The rolling-element bearing according to claim 1, wherein the axial end regions of the groove are formed rounded in radial section.

3. The rolling-element bearing according to claim 1, wherein a bore is formed in the outer ring configured to radially connect the radially-outwardly-extending groove with an outer circumferential surface of the outer ring.

4. The bore according to claim 3 configured to allow passage of a fluid when pressure is generated from the collection of fluid in the radially-outwardly-extending groove.

5. A rolling-element bearing comprising:
an inner ring;
a unitary outer ring having a first raceway and a second raceway disposed axially adjacent to the first raceway, the first and second raceways being configured to support two rows of rolling elements, the unitary outer ring being concave in radial section, and
a cage axially aligning the two rows of rolling elements, and
a circumferential groove between the first and second raceways, wherein the circumferential groove is configured to collect fluid from within the bearing,
wherein the cage and the circumferential groove are in facing opposition and define opposite sides of a chamber in which only fluid may be located such that fluid can condensate for collection in the circumferential groove,
wherein the rolling element bearing is formed as a double row spherical roller bearing or as a self-aligning ball bearing,
wherein a single bore extends from an outer surface of the outer ring to the groove, and
wherein the outer ring includes an indicia marking the position of the bore on the circumference of the outer ring.

6. The rolling-element bearing according to claim 5, wherein the axial end regions of the groove are rounded.

7. The rolling-element bearing according to claim 5, wherein the groove has a substantially rectangular shape or trapezoidal shape in radial section.

8. The rolling-element bearing according to claim 5, wherein a bore is formed in the unitary outer ring configured to radially connect the circumferential groove with an outer circumferential surface of the outer ring.

9. The bore according to claim 8 configured to allow passage of a fluid when pressure is generated from the collection of fluid in the circumferential groove.

\* \* \* \* \*